United States Patent [19]

Katz

[11] 3,939,291

[45] Feb. 17, 1976

[54] GRINDER GAS FIXATION
[75] Inventor: Saul Norman Katz, Monsey, N.Y.
[73] Assignee: General Foods Corporation, White Plains, N.Y.
[22] Filed: May 20, 1974
[21] Appl. No.: 471,633

[52] U.S. Cl. .............. 426/594; 426/386; 426/388
[51] Int. Cl.$^2$ ...................... A23F 1/04; A23F/1/12
[58] Field of Search .......... 426/386, 387, 388, 594, 426/595

[56] References Cited
UNITED STATES PATENTS

| | | | |
|---|---|---|---|
| 2,680,687 | 6/1950 | Lemonnier | 426/386 X |
| 3,021,218 | 2/1962 | Clinton et al. | 426/386 |
| 3,535,118 | 10/1970 | Klein et al. | 426/386 |
| 3,783,163 | 1/1974 | Patel | 426/386 X |
| 3,823,241 | 7/1974 | Patel et al. | 426/386 |
| 3,836,682 | 9/1974 | Yadlowsky | 426/386 |

OTHER PUBLICATIONS

"Coffee Processing Technology" by Sivetz, Vol. 2, Pub. 1963 by Avi Pub. Co., Westport, Conn. pp. 34–35.

Primary Examiner—Tim R. Miles
Assistant Examiner—N. Greenblum
Attorney, Agent, or Firm—Bruno P. Struzzi; Thomas R. Savoie

[57] ABSTRACT

Coffee grinder gas is fixed in a glyceride at relatively high levels by contacting condensed grinder gas frost and the glyceride in a pressure vessel at a temperature which is above the critical temperature of liquid carbon dioxide. The pressure vessel is then slowly vented in order to prevent a drop in temperature to below the critical level.

8 Claims, No Drawings

GRINDER GAS FIXATION

BACKGROUND OF THE INVENTION

This invention is related to commonly-assigned U.S. patent application Ser. No. 371,784 filed June 20, 1973 entitled "Method For Aromatizing Soluble Coffee" wherein is disclosed a method for condensing the aromatic gases given off during the comminution of freshly roasted coffee in a vertically-mounted, scraped-wall heat exchanger which is cooled by means of liquid nitrogen. The condensed gases are collected at the bottom of the heat exchanger in the form of a frost or snow and this frost is mixed with a liquid glyceride and then combined with a coffee extract prior to drying the extract (e.g. freeze drying) or combined with a soluble coffee powder. This application is hereby incorporated by reference. This invention is also related to commonly-assigned concurrently filed U.S. application Ser. Nos. 471,631 and 471,632 which are also incorporated herein by reference.

Grinder gas, that is the gas which is released from roasted whole coffee beans when their internal cell structure is disrupted, such as during grinding of the beans and which also continues to be evolved from the disrupted and/or fractured bean for a short period thereafter, has long been recognized in the art as a highly desirable natural coffee aroma. The collection and stabilization of this aroma has, however, proven to be a difficult undertaking, especially when it is desired for use in a comerical-sized soluble coffee system.

The use of grinder gas as a means to enhance the jar aroma of a soluble coffee powder is disclosed in U.S. Pat. No. 3,021,218 to Clinton, et al which aromatizes the jar headspace and U.S. Pat. No. 2,306,061 to Johnston which condenses grinder gas aromatics onto chilled soluble coffee powder. The use of grinder gas condensates which are added to a liquid extract and dried in order to produce an improved cup aroma when the powder is dissolved in hot water is disclosed in U.S. Pat. No. 3,244,533 to Clinton et al which homogenizes coffee oil in extract and then adds condensed grinder gas aromatics. Co-pending, commonly-assigned patent application, Ser. No. 252,883 filed May 12, 1972 now U.S. Pat. No. 3,821,447 discloses mixing condensed grinder gas frost with a liquid glyceride which mixture is then processed to remove excess water, such as by centrifugation, prior to being combined with soluble coffee solids (e.g. soluble powder).

SUMMARY OF THE INVENTION

The addition of the condensed aromatics to a glyceride material is a known method for attempting to stablilizing the aromatics. Such glycerides as coffee oil, bland-tasting vegetable oils and triacetin have proven especially useful for this purpose; however, other oils and low melting point fats may also be used. It has, however, been desired to maximize the amount of aromatics that are fixed in the glyceride carrier, since this would minimize aroma loss and would reduce the amount the glyceride which would be incorporated with the soluble coffee product to obtain a desired amount of aromatization.

The process of this invention is suited for fixing aromatics contained in an aroma-bearing gas which has a high (e.g. above 80% by weight) carbon dioxide content, and which gas has been condensed as an aroma-bearing frost. This invention is particularly described in terms of coffee grinder gas, which is in excess of 90% by weight $CO_2$, however, it is to be understood that other aroma-bearing gases which have a high carbon dioxide content, such as coffee percolator vent gas and coffee roaster gas may likewise be employed and are considered to be within the scope of this invention.

According to this invention, an aroma-bearing $CO_2$ frost is contacted with a liquid glyceride phase at a temperature and pressure which is above the supercritical point of liquid $CO_2$. It has been found that contacting the gaseous frost and a liquid glyceride phase under pressure increases the level of aromatics which can be transferred from the frost to the glyceride over such processes as the direct atmospheric mixing of the frost and the liquid glyceride. This atmospheric mixing operation has proven to be troublesome in commercial operation, since contact between the condensed frost and the glyceride quickly congeals the glyceride thus making uniform mixing of the two components quite difficult. If the mixture is allowed to warm to a point where the glyceride exists as a liquid, many of the desirable, condensed grinder gas aromatics will escape to the atmosphere.

Contacting the gaseous frost and the glyceride within an isolated pressure vessel as disclosed in concurrently filed, commonly-assigned U.S. application Ser. No. 471,631 has proven to be a desirable method to increase the level of aromatics fixed in the glyceride; however, the end temperatures and pressures disclosed in that application (e.g. 70°F and 855 psig.) permit the presence of liquid carbon dioxide. Conditions which permit the presence of liquid $CO_2$ within the pressure vessel also allows some of the grinder gas aromatics to be dissolved in the liquid $CO_2$ phase according to equilibrium partition conditions based on complex relationships between vapor pressures, solubilities, and chemical potential. When a pressure vessel containing an aroma-bearing liquid $CO_2$ phase is vented, nearly all of the desirable organic materials dissolved in the liquid $CO_2$ will co-distill and be lost in the vent gas, and although this vent gas may be recycled into the system, desirable aromatics will be lost.

This invention describes a procedure based on the critical properties of carbon dioxide that eliminates the liquid $CO_2$ phase and allows additional aromatic compounds to dissolve in the remaining phases present in the vessel (i.e. water, liquid glyceride, and gaseous $CO_2$).

The elimination of liquid $CO_2$, which is a good solvent for non-polar or slightly polar compounds, is desirable, since it will compete with the liquid glyceride phase for many of the desirable aromatics such as mercaptans and long chain aldehydes. Since liquid $CO_2$ can not exist above the critical temperature of 87.8°F, this invention requires that contact between the frost and the liquid glyceride phase within the pressure vessel occur at a temperature above 87.8°F, preferably in the range of about 90°-120°F, and that the vessel is then slowly, preferably isothermally vented, so that liquid $CO_2$ will not form.

The process of this invention may be conducted as a simple batch operation in a single pressure vessel, or as a semi-continuous, countercurrent operation in a battery of pressure vessels.

According to one embodiment this invention, a quantity of aroma-bearing carbon dioxide frost, which may be obtained from a liquid nitrogen-cooled, scraped-surface heat exchanger, is placed in a pressure vessel together with a glyceride material at a weight ratio of grams of frost to grams of glyceride of about 0.5:1 to 6:1. The vessel is isolated from the atmosphere and the vessel contents are continuously supplied with heat by such means as a water jacket. Heat is supplied in sufficient quantities to raise the temperature of the frost and glyceride above 87.8°F.

Alternatively, instead of placing the glyceride into the vessel at the same time as the frost (i.e., before any heat is supplied to the vessel), it would be possible to permit the frost within the vessel to warm, say to above the congeal point of the glyceride, before the glyceride is placed within the vessel.

The vessel may be held at the elevated temperature above 87.8°F for a period of time, in excess of 1 hour and up to several hours, in order to achieve maximum absorbtion of aromatics by the liquid glyceride phase within the vessel. Agitation within the vessel may also prove to be desirable. After slowly venting the vessel, the resulting glyceride contains significantly more aromatics than can be achieved from manual mixing of the two components at atmospheric pressure. The aromatized glyceride should then be processed to remove excess water such as by centriguation, as described in aforementioned Ser. No. 252,883.

The aromatized glyceride may be combined with coffee soluble either in the form of dry soluble coffee, such as by conventional spray plating or any of the techniques disclosed in U.S. Pat. No. 3,769,032, or with a liquid coffee or coffee-like extract, prior to drying the extract. The aromatized glyceride may be solidified, such as by freezing, and comminuted, such as by grinding, prior to being mixed with the soluble coffee powder, such as disclosed in copending commonly-assigned Patent Application, Ser. No. 252,757, filed May 12, 1972 or prior to being combined with a liquid coffee extract, such as disclosed in now abandoned commonly-assigned Patent Application, Ser. No. 252,778, filed May 12, 1972, a slushed coffee extract, such as disclosed in commonly-assigned U.S. Pat. No. 3,809,770 or a partially frozen slab of coffee extract, such as disclosed in commonly-assigned U.S. Pat. No. 3,809,766.

All of the aforementioned patents and commonly-assigned patent applications are hereby incorporated by reference.

DETAILED DESCRIPTION OF THE INVENTION

The most readily available source of grinder gas may be obtained by enclosing or hooding coffee grinding equipment, such as the commerical Gump grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of whole freshly roasted coffee beans. If pumping is employed, it may be desirable to cool the gas ahead of the pump so that the heat added by pumping will not deteriorate the aromatics contained in the gas.

The chemical composition of the evolved gas is largely carbon dioxide together with water vapor and the characteristic aromatic constituents of roasted coffee. The amount of moisture in the gas may be lowered by the use of dry roasting conditions and low-moisture quenches or quenching mediums. The evolved gas is preferably passed through a first condenser where it is cooled to between 35° and 50°F and where substantial quantities of water are removed. The relatively low-moisture gas is then fed to a condenser, such as a jacketed, vertically-mounted, scraped-wall heat exchanger, which is cooled by means of a liquid gas refrigerant.

Preferably, the condenser is cooled by means of liquid nitrogen and the gas flow into the exchanger is maintained within the range of about 1 to 5 cubic feet per minute per square foot of heat exchange surface. The nitrogen gas that evolves from the cooling system is useful as an inert gas stream which might be used elsewhere in the soluble coffee process, such as sweeping grinder gas from the grinder or inert gas packaging of the soluble coffee product.

The aroma bearing gas is condensed into the form of a frost as it comes into contact with the heat transfer wall of the condenser. The frost is removed from the condenser wall and collected for combination with a glyceride carrier. The frost may be held for a short period at low, such as liquid nitrogen, temperatures without deteriorating; however, it is preferred to immediately combine the frost with a glyceride carrier in accordance with this invention. The glyceride, which preferably is coffee oil or a bland-tasting vegetable oil, such as cottonseed, corn or coconut oil, is combined with the frost at a level of about 0.5 to 6 grams of frost per gram of glyceride, preferably at about 1 to 4 grams of frost per gram of glyceride.

According to this invention, contact between the grinder gas frost and the liquid glyceride phase occurs in a sealed pressure vessel. A sufficient amount of the grinder gas frost is added to the vessel in order to avoid the presence of an unsaturated $CO_2$ vapor phase, and sufficient heat is supplied to the contents of the vessel, such as by means of a 90°F to 120°F water jacket, to sublime the grinder gas frost and form a headspace pressure in excess of about 1069.4 p.s.i.a. (87.8°F). At approximately 75 p.s.i.a. solid $CO_2$ changes to liquid, the temperature corresponding to this change being −70°F. At this condition, water and glyceride and some of the organic aromatics, are present in the solid state. As the temperature of the vessel contents continues to be raised above the congeal point of the glyceride, the grinder gas aromatics will diffuse and establish an equilibrium among the water, liquid glyceride, liquid $CO_2$ and gaseous $CO_2$ phases which may be within the pressurized vessel.

As previously mentioned, a critical feature of this invention is the elimination of liquid $CO_2$, which is a good solvent for many aromatics. Elevating the temperature of the vessel contents above 87.8°F, preferably between about 90°F to 120°F, the critical temperature of liquid $CO_2$, precludes the existence of liquid $CO_2$ and consequently additional aromatics will be forced to be distributed between the remaining three phases of water, glyceride and gaseous $CO_2$.

The vessel may be held at supercritical $CO_2$ conditions for a period of time in excess of 1 hour to achieve equilibrium and to maximize absorbtion of aromatics by the liquid glyceride phase. Thereafter, the vessel is slowly vented, care being taken to prevent the formation of liquid $CO_2$. Venting may be conducted by venting the vessel through a section of small diameter tubing the length of which will provide a sufficient pressure drop to prevent a rapid drop of pressure within the vessel. Preferably, the venting will be performed isothermally.

The vent gas will contain at least a low level of aromatics and it would, of course, be possible to recycle or reclaim these aromatics.

After the pressure within the vessel is reduced, the aromatized glyceride is removed from the vessel. If liquid, this can be done by simply decanting or by draining the liquid through a valve in the bottom of the vessel. It would also be possible to permit residual pressure within the vessel to force the liquid out of a vertical withdrawal tube which protrudes through the upper portion of the vessel. The glyceride is then preferably processed so as to remove excess water. If the glyceride is removed from a pressurized vessel, any residual gas present may be retained for use in a subsequent pressure fixation cycle.

The aromatized glyceride phase and any water phase which may be present in the vessel may be separated during removal from the vessel. Alternatively, since water will be the heaviest material within the vessel, it would be possible to remove the bottom liquid water phase at any point in the pressure fixation cycle.

Removing water from the aromatized glyceride, preferably down to a level of 0.5% by weight or less, appears to further stabilize the grinder gas aromatics. As disclosed in the aforementioned application, Ser. No. 252,883, centrifugation, ultracentrifugation, molecular fractionation, drying agents and like methods have proven to be successful techniques for removing water from the aromatized glyceride. As a further refinement of this water removal process, it is possible to separate any aromas from the removed water such as by vacuum distillation and to add these separated aromatics back to the aromatized glyceride.

The aromatized glyceride may be combined with soluble coffee powder or with coffee extract prior to drying the extract in accordance with any of the known prior art techniques or as disclosed in any of the previously enumerated copending, commonly-assigned patent applications. Typical levels of addition for the aromatized glyceride are 0.1 to 2% by weight glyceride based on the weight of soluble solids in the final product. The aromatized powder of this invention may constitute all or only a portion of the powder in the final product, as will be apparent to those skilled in the art.

The term coffee powder and coffee extract used in the description of this invention is meant to include materials containing in whole or in part coffee substitutes such as powders or extracts obtained in whole or in part from roasted cereals such as wheat, rye, barley and the like. One such item is the water extract and resulting dried powder of wheat, barley and molasses known as "Instant Postum."

This invention is further described but not limited by the following example.

EXAMPLE

Coffee grinder gas which was evolved during grinding of freshly roasted coffee beans was passed through a water cooled condenser where 1.25 pounds of water per cubic foot of gas was removed. The gas was then passed to a liquid nitrogen-cooled, scraped-wall heat exchanger where it was condensed and collected as a frost.

80 lbs. of the frost are placed in a 4 cubic foot pressure vessel together with 40 lbs. of expressed coffee oil. The pressure vessel is immersed in a water bath maintained at about 110°F. After 1 hour, the contents of the vessel attain a temperature of about 110°F and a pressure of 1200 psia. The vessel is then slowly vented to ambient pressure over the course of about 3 hours, care being taken to prevent such rapid drops in pressure as would cause the formation of liquid $CO_2$. The vessel contents are centrifuged and about 2 lbs. of water per gallon of liquid are removed. This aromatized "dry" oil when frozen at −20°F is found to remain stable for at least 3 days and to possess a pleasant coffee aroma which can be transferred to a soluble coffee product by such means as spray plating.

Having thus described the invention, what is claimed is:

1. A method for aromatizing soluble coffee with an aromatized glyceride comprising the steps of:
   a. condensing as a frost an aroma-containing gas which has a high carbon dioxide content,
   b. placing the aroma-containing frost in a pressure vessel, the amount of frost being sufficient to provide a saturated carbon dioxide phase within the vessel,
   c. isolating the vessel from the atmosphere,
   d. supplying heat to the the vessel to raise the internal temperature above 87.8°F.,
   e. contacting within said heated vessel the frost aromas and a liquid glyceride phase said glyceride being present in the vessel at a level of about one gram of glyceride to 0.5 to 6 grams of the frost; thereafter,
   f. slowly releasing pressure from the vessel in a manner which avoids the formation of liquid carbon dioxide, and then
   g. combining the aroma-bearing glyceride with coffee solids.

2. The method of claim 1 wherein the aroma-bearing glyceride is added to soluble coffee powder.

3. The method of claim 1 wherein the contents of the vessel is raised to between about 90°F and 120°F.

4. The method of claim 3 wherein heat is supplied to the vessel contents by means of a water bath.

5. The method of claim 1 wherein the vessel contents are maintained at above 87.8°F in excess of 1 hour.

6. The method of claim 1 wherein the pressure within the vessel is released isothermally.

7. The method of claim 1 wherein the frost and the glyceride are placed in the vessel before any heat is supplied to the vessel.

8. The method of claim 1 wherein the aroma-bearing gas is obtained by disrupting the cellular structure of freshly roasted coffee beans.

* * * * *